Aug. 24, 1937. K. ALT 2,090,719
FORM OF PIPE COUPLING
Original Filed Dec. 26, 1935 2 Sheets-Sheet 1

Inventor:
Karl Alt

Patented Aug. 24, 1937

2,090,719

UNITED STATES PATENT OFFICE 2,090,719

FORM OF PIPE COUPLING

Karl Alt, Cape Town, Union of South Africa

Application December 26, 1935, Serial No. 56,285
Renewed July 15, 1937

3 Claims. (Cl. 285—175)

My invention relates to the method of making a joint in two lengths of piping and/or hosing of all types.

The coupling is made up of two main parts, an inner and an outer housing. The outer housing has the male portion of a conical joint and the inner housing has the female portion of a conical joint. These cones are made of rubber composition or other suitable material.

The object of my invention is to provide a coupling which firstly, is easy to assemble; secondly which is capable of withstanding strong pressure of any magnitude; thirdly which provides an increase in sealing effect corresponding to an increase of pressure; fourthly which ensures complete sealing whether the substance flowing be water, gas, steam, compressed air or any other material whatever; fifthly which enables a reduction or increase of diameter of the conveying pipe to be effected.

I attain these objects by the components illustrated in the accompanying drawings in which:—

Figure 1:
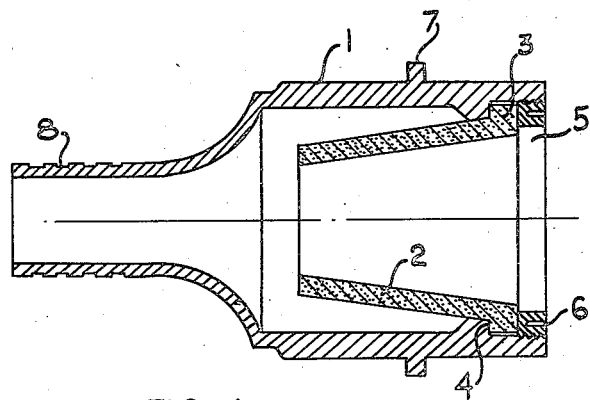
Figure 2:
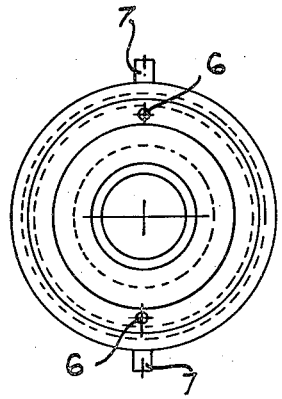
Figure 3:
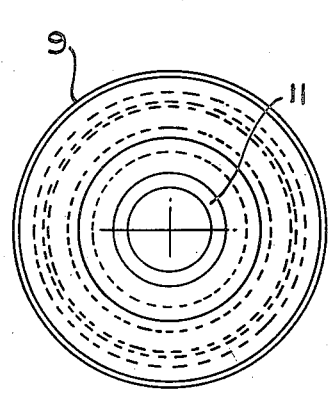
Figure 4:
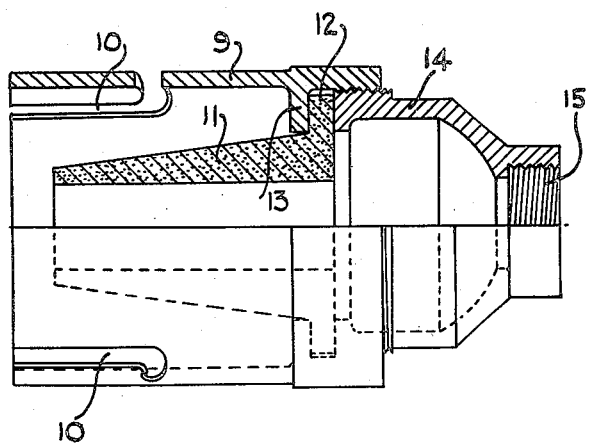
Figure 5:
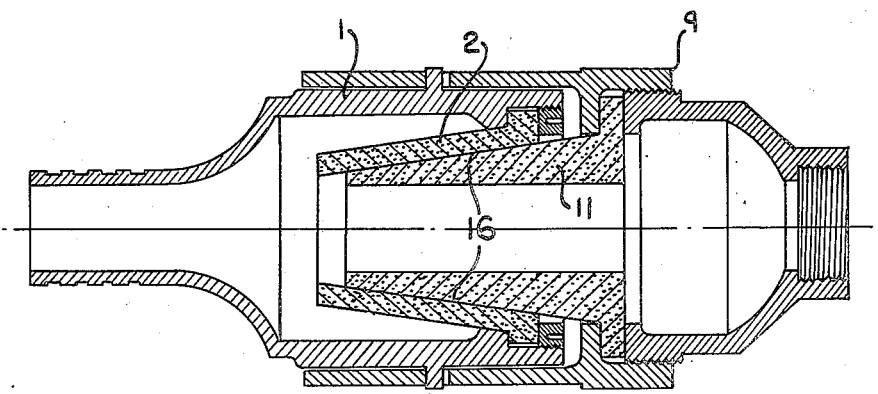
Figure 6:
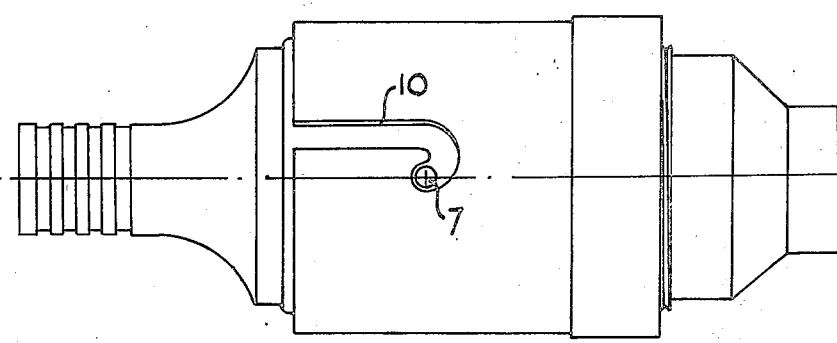

Figure 1 is a cross section of the female portion. Figure 2 is an end elevation of Figure 1. Figure 3 is an end elevation of the male portion. Figure 4 is an outside elevation, top half in section, of the male portion. Figure 5 is a cross section of the whole assembled and Figure 6 is an outside elevation of Figure 5.

Figure 1 shows a cross section of the inner housing of metal 1, with female cone of rubber or other suitable material, 2 with projecting flange 3 which is locked or gripped against projecting shoulder 4 on housing 1 by means of locking ring 5 which is tightened up by means of two holes 6 as shown in Figure 2, which is an end elevation of Figure 1. Projecting pegs 7 lock in slots in outer housing as shown in Figure 4. Provision is made for attaching hose or pipe as shown at serrated portion 8.

Figure 3 is an end elevation of outer housing, and Figure 4 a side elevation of outer housing, with the top half in section. The outer housing proper is shown at 9 with slots 10 and male cone 11 with projecting flange 12, which is locked against projection 13 by means of locking or retaining portion 14 as shown. This retaining portion 14 is screwed, as shown at 15 in various sizes to fit standard pipe threads or hose connections at 8 Figure 1, which means the coupling can be made to suit any diameter of hydraulic, air, gas or other pipe lines.

Figure 5 shows a cross section of the whole coupling assembled with cones 11 and 2 forming the joint around circular surface 16. Figure 6 shows an outside elevation of Figure 5 with pegs 7 in position in slots 10.

It will be seen from Figure 5 that when in operation the flow of substance through the coupling tends to cause the male cone 11 to expand while the pressure exerted by the substance between housing 1 and female cone 2 tends to cause contraction of female cone 2, thereby causing a complete sealing effect around the circular surface 16 between the two cones.

It will also be seen from Figure 4 that a metallic pipe can be fitted to the thread 15 and from Figure 1 that a rubber or other hose can be secured to serrations 8 so that the coupling can be employed to connect a metal pipe with a rubber or other pliable hose. Alternatively by providing an internal screw to 8 or by providing serrations at 14 on the portion outside thread 15 the joint is universal and can be used or adopted to join metal pipes, hoses or metal pipes to hose.

It will also be seen that the coupling is protected from damage by reason of the fact that the male and female cones which provide the operative portion of connection, are solidly protected by outside housings of metal.

It will further be seen that there is an entire absence of friction between the operative parts of the coupling resulting in durability and strength, and that the two portions of the joint can be locked or disconnected in one movement.

It will further be seen that by varying in the course of manufacture, the diameter of the serrated portion 8, or of the thread 15 in relation to each other, I provide a means of reducing or increasing the bore of the pipe conveying the flowing substance.

Having now particularly described and ascertained the nature of my invention, I claim:—

1. In a coupling device, an outer housing, an inner housing, means for detachably securing said inner housing within said outer housing, a conical elastic member having a cylindrical passage therethrough secured within said outer housing with the cone tapering toward the inner housing, a second conical elastic member having a passage adapted to receive said first named elastic member and fit against the outer surface thereof secured on the interior of said inner housing whereby fluid under pressure within the housings will compress said elastic members against each other.

2. A coupling comprising an outer housing having an interior flange and means for securing a pipe in one end of said housing, a conical male elastic tube having an external flange at its larger end resting on said interior flange and adapted to be held thereto by said pipe, said tube having a cylindrical passage therethrough, an inner housing, an interior flange thereon, a female conical elastic tube therein having an exterior flange, means for securing said last named flange against the flange of the inner housing, said female elastic member having a conical passage therethrough within which the male elastic tube extends and means for detachably securing the inner housing to the outer housing.

3. A coupling comprising an inner and an outer housing, means for detachably securing said housings together, a conical elastic member having a passage therethrough secured to the outer housing and a second conical elastic member having a passage therethrough secured to the inner housing, said first elastic member protruding into the passage of said second elastic member with its outer surface contacting the walls of said last named passage whereby fluid under pressure in said coupling will compress said elastic members together.

KARL ALT.